United States Patent [19]

Wyler

[11] Patent Number: 4,475,843

[45] Date of Patent: Oct. 9, 1984

[54] APPARATUS FOR CLAMPING CABLES

[75] Inventor: Gary J. Wyler, Saylorsburg, Pa.

[73] Assignee: McGraw-Edison Company, Rolling Meadows, Ill.

[21] Appl. No.: 529,084

[22] Filed: Sep. 2, 1983

[51] Int. Cl.³ .............................................. B25G 3/36
[52] U.S. Cl. .................................... 403/394; 256/55; 403/399
[58] Field of Search ............... 403/394, 396, 400, 399, 403/391; 256/54, 55; 24/129 B, 135 R, 136 B

[56] References Cited

U.S. PATENT DOCUMENTS 3,497,249  2/1970  DuBois .............................. 403/391

FOREIGN PATENT DOCUMENTS

| 838218 | 3/1939 | France | 403/394 |
| 923971 | 2/1947 | France | 403/391 |
| 2299547 | 8/1976 | France | 403/400 |
| 600385 | 4/1948 | United Kingdom | 403/396 |

Primary Examiner—Andrew V. Kundrat
Attorney, Agent, or Firm—John S. Paniaguas; James A. Gabala; Jon Carl Gealow

[57] ABSTRACT

An apparatus for clamping a pair of cables includes a clamp body of a clam shell configuration. The body includes first and second legs joined by an integral hinge. The clamp body and hinge are fabricated of a deformable material. First and second diagonal grooves are formed in the first and second legs and disposed at approximately a right angle to each other. First and second cables are placed in the grooves and the clamp closed over the cables. A one piece fastener such as a self-tapping screw is employed to close and tighten the clamp body about the cables partially deforming the clamp body and providing primary and secondary gripping forces on the cables.

14 Claims, 5 Drawing Figures

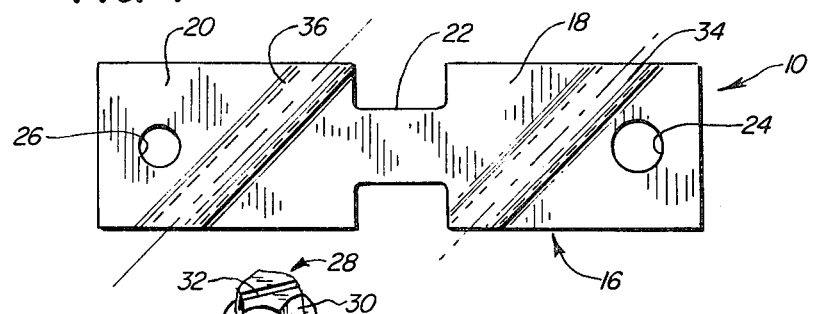
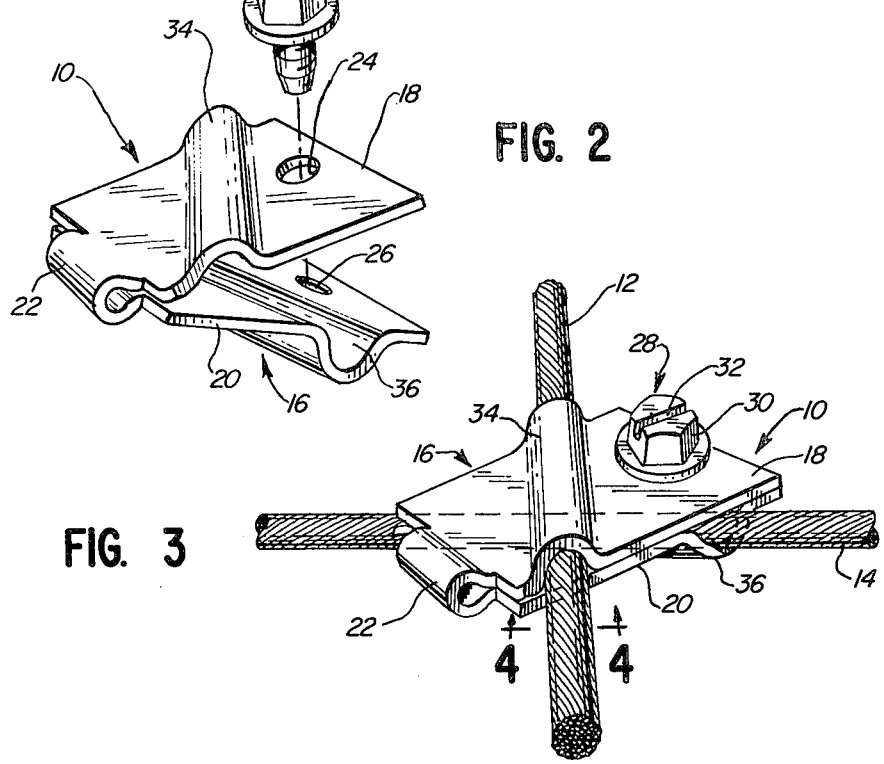
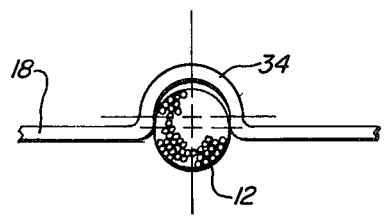
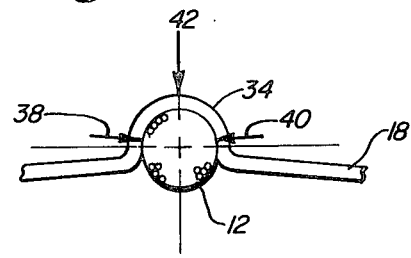

APPARATUS FOR CLAMPING CABLES

BACKGROUND OF THE INVENTION

The present invention relates to a new and improved clamp for clamping a pair of cables and more particularly, to a new and improved clamp easily used in the field.

Utility poles, support poles and similar structures often employ steel cables for structural integrity. Typically, in these structures it is necessary to clamp together two steel cables that cross each other at an angle. Known clamps include at least two separate body portions joined together by a set of screws and nuts. This four piece clamp is expensive to manufacture and makes installation in the field extremely difficult. The clamp is often used in the field with the installer in a gondola positioned many feet above the ground or secured to a pole. Using the four piece clamp in this position is very difficult. The installer must juggle the several separate parts and assembly tools while assembling the clamp on the cables.

An example of a typical clamp is illustrated in U.S. Pat. No. 3,177,542. This clamp includes multiple pieces and is capable of holding only one cable. A screw and nut are required for fastening the clamp thereby increasing the number of parts to be handled by an installer. The clamp of the '542 patent is based on a cantilevered beam design capable of clamping only a single cable and not being of a design capable of providing an equal clamping load on two cables. The clamping device of the '542 patent is intended to support cable weight by gripping the cable from the sides and is not designed to prevent two crossing cables from sliding across each other while being held.

A clamp for holding two members is disclosed in U.S. Pat. No. 4,097,169. This clamp is also a multipiece device. Although the clamp supports two elements, it cannot clamp two crossing cables and suffers the same deficiencies described with regard to U.S. Pat. No. 3,177,542.

Patents disclosing clamps for crossing elements are illustrated in U.S. Pat. Nos. 526,123; 533,654 and 2,333,869. The devices in the '123 and '869 patents each have a number of pieces, making assembly in the field difficult. The device of the '654 patent is a one piece device. However, the holding forces are provided by bending the device about the crossed wires. Such a device is only capable of holding relatively lightweight wires, cannot prevent the wires from sliding and would not have the structural integrity required for clamping larger members such as steel cable.

SUMMARY OF THE INVENTION

An object of the present invention is to provide a new and improved clamp for cables.

Another object of the present invention is to provide an improved clamp for cables that is fast and easily installed.

A further object of the present invention is to provide an improved clamp that is lightweight, includes a minimum number of parts and requires common tools for installation.

A still further object of the present invention is to provide a new and improved clamp for clamping steel cables that cross each other at an angle that when secured on the cables, develops primary and secondary gripping forces.

Briefly, the present invention is directed to a new and improved clamp for clamping two cables together that cross at an angle. The clamp is defined by a clamp body including upper and lower portions joined by an integral hinge. A first diagonal groove is fabricated in the upper portion and a second diagonal groove is formed in the lower portion. The first and second diagonal grooves are at an angle, preferably a right angle, to each other. A self-tapping screw is provided for fastening the upper portion to the lower portion and deforming the first and second grooves about the cables to impart primary and secondary gripping forces.

The above and other objects and advantages and novel features of the present invention will become apparent from the following detailed description of a preferred embodiment of the invention illustrated in the accompanying drawing.

BRIEF DESCRIPTION OF THE DRAWING

FIG. 1 is a plan view of a clamp constructed in accordance with the principles of the present invention after forming and before folding;

FIG. 2 is a perspective view of the clamp of the present invention folded to a position ready for clamping a pair of cables;

FIG. 3 is a perspective view of the clamp holding a pair of cables;

FIG. 4 is a view taken along line 4—4 of FIG. 3 before tightening a fastener in the clamp; and FIG. 5 is a view similar to FIG. 4 after tightening of the fastener.

DETAILED DESCRIPTION OF THE PREFERRED EMBODIMENT

Referring to the drawing, there is illustrated a lightweight clamp generally designated by the reference numeral 10. Clamp 10 is used to secure or clamp two cables 12 and 14 that cross at an angle; preferrably a 90° angle.

Clamp 10 may be cut or stamped out of a single sheet of deformable material as best illustrated in FIG. 1. Clamp 10 includes a body generally designated by the reference numeral 16 with an upper body portion 18 and a lower body portion 20. Upper body portion 18 and lower body portion 20 are generally of identical configurations and in the preferred embodiment illustrated are rectangular in shape. It should be understood, however, that any configuration may be used.

Upper body portion 18 and lower body portion 20 are joined by an integral hinge 22 of reduced width or cross section to allow flexible bending of clamp 10 to the preclamping configuration, illustrated in FIG. 2. A first aperture 24 is fabricated in upper body portion 18. A second aperture 26, aligned with the first aperture 24, is fabricated in lower body portion 20.

The diameter of aperture 24 is slightly larger than the diameter of aperture 26 to allow threading and securement of a self-tapping screw 28. Fastener or screw 28 includes a hexagonal head 30 and a slot 32 allowing an installer to use a wrench, socket or straight blade screw driver in assembling clamp 10. Other configurations are possible depending on the installation tool. Easy installation of clamp 10 is possible since an installer may grip the clamp 10 in the configuration illustrated in FIG. 2 in one hand and the tool in the second hand.

To hold cables 12 and 14, a first diagonal groove 34 is formed in the upper body portion 18. Similarly, a second diagonal groove 36 is formed in the lower body portion 20. Preferably, grooves 34 and 36 in the folded configuration illustrated in FIG. 3 are at a 90° angle to each other. Grooves 34 and 36 and pressure between the cables prevent cables 12 and 14 from sliding across each other.

Grooves 34 and 36 are formed at locations in upper body portion 18 and lower body portion 20 such that cables 12 and 14 when clamped, as illustrated in FIG. 3, are located between the hinge 22 and the self-tapping screw 28. This location provides a single span beam effect when clamp 10 is secured onto cables 12 and 14. The single span beam effect is enhanced by the diagonal location of grooves 34 and 36 which adds stiffness to the beam.

During installation, an installer positions cables 12 and 14 in the respective grooves 34 and 36 while holding the clamp 10 in the open configuration illustrated in FIG. 2. With one hand the installer manually closes clamp 10 to the position, illustrated in FIG. 3, and with the other hand places screw 28 into aperture 24 and using a screwdriver wrench or other tool, threads the self tapping screw 28 into aperture 26.

Prior to tightening screw 28, the grooves, for example groove 34 (FIG. 4), applies a primary gripping force on the cables, for example cable 12. At completion of tightening screw 28, grooves 34 and 36 are deformed about the cables 12 and 14 as illustrated in FIG. 5. This deformation results in secondary gripping or pinching forces at points indicated by arrows 38 and 40 that supplement the beam action clamping force indicated by arrow 42. Typical prior art clamps do not deform around the cables and provide only a beam action clamping force designated by the arrow 42. Clamp 10 provides the secondary clamping or pinching forces thereby providing a more secure grip on cables 12 and 14.

What is claimed is:

1. An apparatus for clamping at least two cables together, comprising:
    a clamp body including an upper portion and a lower portion,
    a bendabble hinge secured on said upper portion and said lower portion joining said upper and lower portions to define said clamp body in a clam shell configuration,
    one piece fastening means for fastening said upper portion to said lower portion, said upper portion including a first diagonal groove formed therein and said lower portion including a second diagonal groove formed therein,
    said clamp body being fabricated of a deformable material, such that said first and second diagonal grooves deform about said cables to impart pinching forces between the sides of said grooves and said cables to thereby hold said cables securely with respect to each other.

2. The clamping apparatus set forth in claim 1 wherein said one piece fastening means comprises a self-tapping screw.

3. The clamping apparatus set forth in claim 1 wherein said hinge is integral with said upper portion and said lower portion.

4. The clamping apparatus set forth in claim 1 wherein said fastening means is on a side of said body opposite said hinge.

5. A clamp for a pair of cables, comprising:
    a clamp body configured in a V-shape, said V-shaped body including first and second legs joined by a hinge,
    a first diagonal groove defined in said first leg for holding a first of said cables;
    a second diagonal groove defined in said second leg for holding a second of said cables;
    said clamp body being fabricated of a defomable material such that said diagonal grooves deform about said cables to impart pinching forces between the sides of said grooves and said cables to thereby hold said cables securely with respect to each other.

6. The clamp claimed in claim 5 wherein said first groove is disposed at approximately a ninety degree angle relative to said second groove.

7. The clamp claimed in claim 5 further comprising a one piece fastener for maintaining said clamp body in a closed configuration.

8. The clamp claimed in claim 7 wherein said fastener is secured to said clamp body on a side opposite said hinge.

9. A clamp for clamping a pair of cables, comprising:
    a clamp body defined by upper and lower body portions joined at the first ends by an integral, deformable hinge;
    first diagonal groove means, in said upper body portion, for containing one of said pair of cables, said first diagonal groove means defining two adjacent sides which are adapted to deform about said one cable to impart pinching forces between said sides and said first cable to thereby hold said one cable securely within said upper body portion;
    second diagonal groove means, in said lower body portion, for containing the second of said pair of cables, said second groove means defining two adjacent sides which are adapted to deform about said second cable to impart pinching forces between said sides and said second cable to thereby hold said second cable securely within said lower body portion;
    said sides of said first groove means being disposed at approximately a ninety degree angle relative to said second groove means; and
    one piece fastener means, passing through said upper and lower body portions, for fastening together said upper and lower body portions,
    said hinge and said fastener means being located on opposite sides of said clamp body with said first diagonal groove means and said second diagonal groove means being located between said hinge and said fastener means.

10. The clamp set forth in claim 9 wherein said fastener means comprises a self-tapping screw.

11. The clamp set forth in claim 9 wherein said clamp body is fabricated of deformable material.

12. A method of clamping a pair of cables, comprising the steps of:
    providing a one piece clamp with a clam shell configured body of deformable material, said body including a pair of diagonal grooves at approximately a right angle to each other and an integral hinge,
    placing cables in each of said grooves,
    securing a one piece fastener on said clamp to close said clamp on said cables to provide a primary gripping force on said cables, and tightening said fastener to deform said clamp body at said grooves around said cables to provide a secondary gripping force on said cables.

13. The method of clamping set forth in claim 12 further comprising the step of positioning said hinge and said fastener on opposite sides of said body and locating said cables between said hinge and said fastener to provide a beam action clamping force on said cables.

14. The method of clamping set forth in claim 12 further comprising the step of providing a self-tapping screw for said fastener.

* * * * *